United States Patent [19]

Henson et al.

[11] Patent Number: 5,558,894

[45] Date of Patent: Sep. 24, 1996

[54] PROCESS FOR FORMING A PUFFED FOOD PRODUCT

[75] Inventors: William D. Henson, Duncanville; Stephen L. Rice, Lewisville, both of Tex.

[73] Assignee: Recot, Inc., Pleasanton, Calif.

[21] Appl. No.: 416,635

[22] Filed: Apr. 5, 1995

[51] Int. Cl.$^6$ ............................ A21D 8/00; A23L 1/18
[52] U.S. Cl. .................... 426/498; 426/312; 426/391; 426/446; 426/496; 426/512; 426/514; 426/518; 426/559; 425/237; 425/387.1
[58] Field of Search .................... 426/391, 414, 426/446, 496, 498, 512, 514, 518, 559, 312; 425/130, 237, 249, 387.1, 367

[56] References Cited

U.S. PATENT DOCUMENTS

| | | | |
|---|---|---|---|
| 1,890,697 | 12/1932 | Scalan | 426/446 X |
| 1,924,826 | 8/1933 | Anderson | 426/559 |
| 2,497,212 | 2/1950 | Denofrio | 425/237 X |
| 3,173,794 | 3/1965 | Reckon | 99/81 |
| 3,310,006 | 3/1967 | Hasten et al. | 107/1 |
| 3,641,737 | 2/1972 | Tamagni | 53/182 |
| 4,303,690 | 12/1981 | Haas, Sr. et al. | 426/514 X |
| 4,381,906 | 5/1983 | Mancini | 426/514 X |
| 4,455,321 | 6/1984 | Glabe et al. | 426/559 X |
| 5,176,936 | 1/1993 | Creighton et al. | 426/559 X |
| 5,240,731 | 8/1993 | Bornhorst et al. | 426/549 |
| 5,268,187 | 12/1993 | Quinlan | 426/496 |

FOREIGN PATENT DOCUMENTS

| | | | |
|---|---|---|---|
| 8806849 | 9/1988 | WIPO | |
| 9008527 | 8/1990 | WIPO | 425/294 |

*Primary Examiner*—Esther Kepplinger
*Assistant Examiner*—Milton I. Cano
*Attorney, Agent, or Firm*—Jones, Day, Reavis & Pogue

[57] ABSTRACT

A process for making a half-product used in forming puffed food products, the apparatus having two rollers, with at least one of them being a cutter roller having cutting teeth, rotating against each other. Product flows between the two rollers in the form of dough strips and an air nozzle is disposed between them to provide air flow causing deformation of the product and forming an air pocket. The teeth may be on both rollers and in meshing contact with one another. The teeth also have a V-shape with a rounded radius at the cutting end so that it rolls into the dough product and back out thereof to form a large sealing surface between the two pieces of dough and forming an improved seal so that when the food product is fried the sealed area does not split open from increased pressure inside the hollow food product.

5 Claims, 1 Drawing Sheet

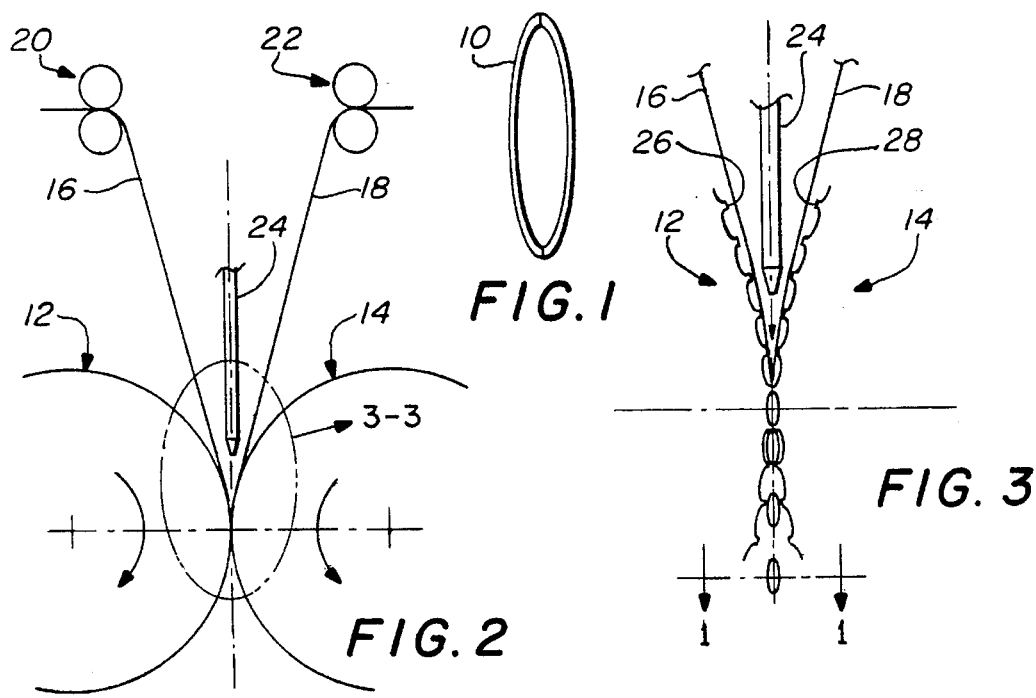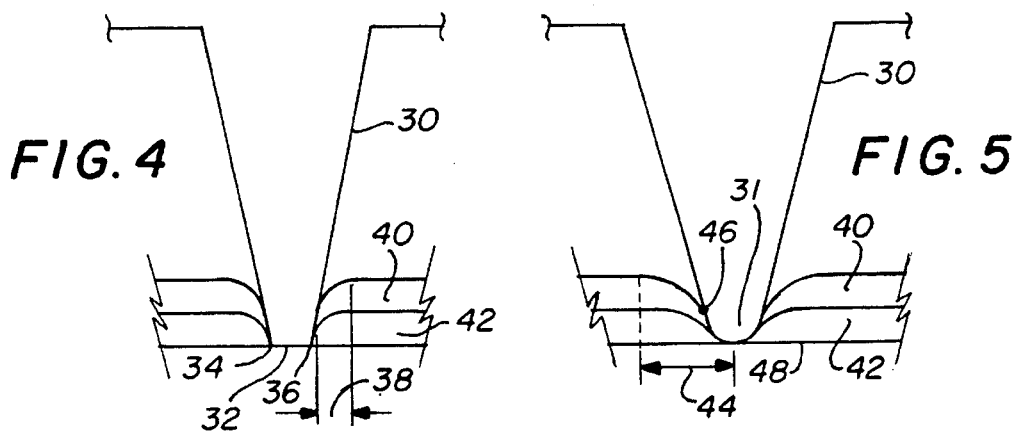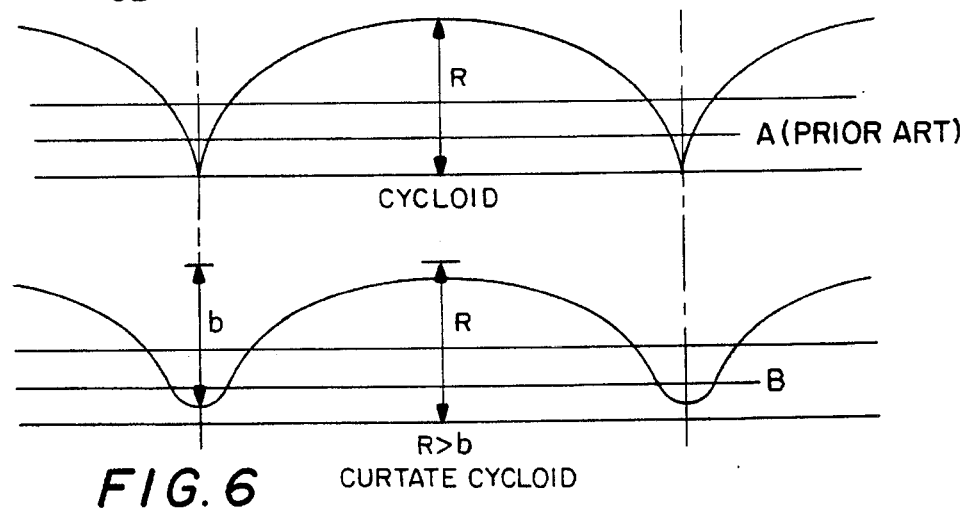

PROCESS FOR FORMING A PUFFED FOOD PRODUCT

BACKGROUND OF THE INVENTION

1. Field of the Invention

The present invention relates generally to puffed food products and in particular to a cutting and air injecting apparatus, including a rotating cutter roller with a surface configuration in the desired shape of the puffed food product, a back-up roller and an air manifold system to inject air between the layers of dough of a laminated food product before a shaped piece is cut by the rotating cutter roller. Thus the shaped laminated pieces are sealed around all edges and have a slight puffed appearance due to the air entrapped between the layers. By having a slight puffiness, the inner surfaces of the laminate do not bond and thereby form a puffed product when fried in cooking oil.

2. Description of Related Art

It is well known in the art to form puffed food snack products from laminated strips of dough. It is also known that adjacent layers or sheets of dough frequently stick together and thus do not puff when cooked. Some processes use chemicals or yeast for generating leavening gases in an attempt to form the hollow food product. In U.S. Pat. No. 5,268,187, the food product is formed of adjacent sheets of dough, the interface between adjacent layers is sealed continuously around their extremity, and then the shaped food articles are cooked in a manner such that steam generated between the layers is of sufficient pressure to force the layers apart in the center of the article to create a void in the central area.

SUMMARY OF THE INVENTION

The present invention overcomes the disadvantages of the prior art by providing a simple and economical manner of forming a puffed food snack product by injecting a fluid such as air between the sheets of food material as the sheets enter first and second rotatable rollers in abutting relationship, where at least one of the rollers has a pattern of cutting surfaces on the periphery thereof to form the desired shape for the food product. A fluid, such as air, is injected between the first and second food product dough strips as they enter between the rotating rollers to form a pocket between the first and second food product dough strips prior to the complete sealing of the edges thereof to form a half-product for producing a puffed food product. Thus, air is entrapped between the inner laminated food product dough strips thereby preventing the inner laminated surfaces from collapsing on each other.

In order to form a better seal around the edges of the food product with the entrapped air between the laminated food strips, a cutter on a roller surface is used that is substantially V-shaped as in the past but which has a rounded or arcuate outer end cutting surface, such that, as the cutting surface of the raised cutter enters and leaves the superimposed first and second laminated dough strips, the rounded outer end creates an elongated sealing surface between the food strips.

Thus, it is an object of the present invention to provide a process for making a half-product for forming a puffed food by injecting a fluid between first and second parallel food product dough strips as they are introduced between first and second rotatable rollers having cutting surfaces thereon to form a hollow pocket between the first and second food product dough strips prior to the complete sealing of the edges thereof.

It is also an object of the present invention to provide a process for making a half-product for forming a puffed food formed of first and second parallel food product dough strips by injecting air between the adjacent food strips before they are sealed together to form an air pocket.

It is still another object of the present invention to provide a hollow puffed food product formed of first and second parallel food product dough strips wherein a pocket is formed between the first and second dough strips and wherein the pocket shape is generally maintained.

It is also an object of the present invention to provide a cutting edge on the outer cutting end of a raised pattern of cutting elements on the periphery of a roller wherein the cutting edge is arcuate in cross section so that it rolls into and out of the food product dough strips at large angles to form an elongated sealing surface between the dough strips at the edges thereof while forming the half-product.

Thus, the present invention relates to a process for making a half-product for forming a puffed food comprising the steps of placing first and second rotatable rollers in abutting relationship, at least one of the rollers having a pattern of cutting elements on the periphery thereof to form a desired shape for the food half-product, feeding first and second parallel food product dough strips between the rotating rollers in superimposed relationship such that the roller cutting elements cut the desired shape of the food product from the superimposed dough stripes and seal the edges thereof with the cutting elements, and injecting air between the first and second food product dough strips as they enter between the rotating rollers to form an air pocket between cut shapes of the first and second food product dough strips prior to the complete sealing of the edges thereof to form a half-product for producing a puffed food product.

The invention also relates to an apparatus for making a half-product for forming a puffed food comprising first and second rotatable rollers placed in abutting relationship, at least one of the rollers having a pattern of cutting elements on the periphery thereof to form a desired shape for the food half-product, first and second parallel food product dough strips fed between the rotating rollers in superimposed relationship, said roller elements cutting the desired shape of the food product and sealing the edges thereof with the cutting elements, and a fluid injected between the first and the second food product dough strips as they enter between the rotating rollers to form an air pocket between the first and second food product dough strips prior to the complete sealing of the edges thereof to form a half-product for producing a puffed food product.

BRIEF DESCRIPTION OF THE DRAWINGS

These and other features of the present invention will be more fully disclosed when taken in conjunction with the following DETAILED DESCRIPTION OF THE DRAWINGS in which like numerals represent like elements and in which:

FIG. 1 is a cross-sectional view of a half-product for forming a puffed food taken along lines 1—1 in FIG. 3;

FIG. 2 is a generalized schematic arrangement of the present invention illustrating two rollers in abutting relationship, at least one of which is a cutter roller and having introduced therebetween two parallel strips of product dough with an air nozzle in between at the point where the product dough strips or sheets enter between the rollers to form the air pocket;

FIG. 3 is a second generalized schematic representation of two rollers in abutting relationship where both of the rollers have cutting elements thereon that meet in touching relationship to form the half-product for forming a puffed food;

FIG. 4 is a partial side view of a prior art cutting surface for the cutting elements illustrating the sharp edges on the outer cutting end of the elements that provide a small sealing surface between the layers of the food product dough strips;

FIG. 5 is a side view of the novel cutting element of the present invention showing the outer cutting end thereof to be arcuate in shape to provide a larger sealing surface between the two laminated dough pieces; and FIG. 6, curve A, is a representation of a cycloid waveform representing movement of a point on the radius of a circle as the circle rolls along a plane and which represents the movement of the traditional cutting tooth and FIG. 6, curve B, is a representation of a curtate cycloid representing the movement of a point on a circle at a distance b from the center of the circle of radius R, where R>b, that rolls along a fixed straight line and that represents the type of movement of a point on the curved shoulder of the outer arcuate end of the novel cutting element shown in FIG. 5 and thereby illustrating that a larger sealing surface is obtained with the new novel design.

DETAILED DESCRIPTION OF THE DRAWINGS

It is to be understood that the food product of the present invention can be of any desired shape so long as it is a puffed configuration with an entrapped fluid such as air between laminated strips as illustrated in FIG. 1, which is a cross section of one of the food products being formed with the arrangement of FIG. 3.

The basic principle of the invention is disclosed in FIG. 2 wherein rollers 12 and 14 are shown in abutting relationship. At least one of the rollers 12 and 14 has a cutting pattern formed thereon as is well known in the art and as is illustrated in cross section and shown in FIG. 3. The other roller 12 or 14 may be the backup roller that engages the cutting pattern or configuration on roller 14. As stated previously the cutter rollers may be of any well-known type and therefore are not disclosed in any detail here. Suffice it to say that first and second product strips 16 and 18 are fed by pairs of rollers 20 and 22 between the cutting rollers 12 and 14 at an angle thereto. Positioned between the food product dough strips 16 and 18 as they enter between the rotating rollers 12 and 14 is an air nozzle 24 that injects air between the first and second product dough strips to form an air pocket prior to the complete sealing of the edges thereof as the rollers rotate to thereby form a half-product for producing a puffed food product. Without the presence of the air nozzle, the inner surfaces of dough strips 16 and 18 have a tendency to fall together and stick to each other such that when they are subsequently fried they remain in that condition, thus preventing the formation of a puffed food product.

In the embodiment illustrated in FIG. 3, both of the rollers 12 and 14 have cutting elements or teeth 26 and 28 thereon and wherein the cutting elements 26 and 28 on both the first and second rollers 12 and 14 are in superimposed meshing relationship during rotation of the first and second rollers 12 and 14 to form the desired product. Again, it can be seen in FIG. 3 that the air from nozzle 24 is injected between the product strips 16 and 18 just prior to their being sealed on all edges or the periphery thereof. The food product is subsequently fried as is well known in the art to produce the puffed food product.

FIG. 4 illustrates the typical cutting element 30 on prior art cutting rollers to cut the shape of the food product and seal it around the edges. Note how the sharp corners 34 and 36 have the same radius as the flat surface 32. Thus, such configuration causes a very small sealing surface as illustrated by the area 38 between the edges of the two product strips 40 and 42. The reason is believed to be illustrated in FIG. 6, curve A, that represents the curve of a cycloid generated by a point of a circumference of a circle that rolls along a fixed straight line. Notice the sharp angle at which the curve approaches the straight line on which the circle is rolling. Thus, a small sealing area surface 38 is formed between the two food product strips 40 and 42 and sometimes enables the surfaces to separate, thus allowing the air to escape and the two dough strips to collapse against each other. In such case, a puffed food product would not form when fried.

The present invention utilizes a cutting element that has a V-shaped raised portion having an outer cutting end with a cutting edge on the cutting end of the raised portion that is arcuate in cross section as shown at 3, to roll into and out of the food product dough strips at an elongated angle to form an elongated sealing area surface between the dough strips forming the half-product. Thus, the elongated sealing area surface designated by the arrow 44 is formed in FIG. 5 and it can be seen to be much larger than the sealing surface 38 formed by the traditional prior art cutting surface illustrated in FIG. 4. The reason that it is believed that the larger sealing surface is formed is illustrated by FIG. 6, curve B, which is a curtate cycloid representing a curve described by a point on a circle at a distance b from the center of the circle of radius R, when R>b and that rolls along a fixed straight line. Thus, in FIG. 5, the point 46 on the V-shaped raised portion 30 is above the line 48 representing the radius of the tooth 30. The point 46 will follow a curve illustrated in FIG. 6, curve B, thus giving a much wider sealing edge or larger sealing surface between the two food product strips 40 and 42.

Thus, with the device of the present invention, a greater amount of the puffed food product can be formed because the half-product has a greater tendency to retain its open shape with air between the sealed surfaces because of the larger sealing surfaces or areas along the edges and because air was injected just prior to the edges being sealed.

Thus, as can be seen in FIG. 2, first and second rotatable rollers are placed in abutting relationship with at least one of the rollers having a pattern of cutting elements on the periphery thereof to form a desired shape for the food half-product. The first and second parallel food product dough strips are fed between the rotating rollers in superimposed relationship to cut out the desired shape of a food product and seal the edges thereof with the cutting elements. A fluid such as air is injected by a nozzle between the first and second food product dough strips as they enter between the rotating rollers to form an air pocket between the first and second food product dough strips prior to the complete sealing of the edges thereof to form a half-product for producing a puffed food product. Other fluids could be used than air, but air is the preferred fluid to be used. The cutting element or surface of the at least one roller is a V-shaped raised portion having an outer cutting end that is arcuate in cross section to roll into and out of the food product dough strips at an elongated angle to form an elongated sealing surface between the dough strips forming the half-product.

In the second embodiment illustrated in FIG. 3, cutting elements or surfaces are formed on both the first and second rollers, the cutting surfaces being in superimposed meshing relationship during rotation of the first and second rollers.

Thus, there has been disclosed a novel process and apparatus for forming a half-product used to complete a puffed food product by subsequent steps such as frying. The invention utilizes an injection of fluid, preferably air, between the two strips of dough to hold the dough strips apart until their edges are sealed, thus having a pocket of air entrapped between the laminated dough strips. In addition, the teeth forming the cutting elements or surfaces are formed with V-shaped raised portions having curved or arcuate outer ends in order to form a greater sealing surface between the edges of the dough strips as they are cut by the cutting surfaces.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

We claim:

1. A process for making a half-product for forming a puffed food comprising the steps of:

placing first and second rotatable rollers in abutting relationship, at least one of said rollers having a pattern of cutting elements on the periphery thereof to form a desired peripheral shape for the food half-product;

feeding first and second parallel food product dough strips between said rotating rollers in superimposed relationship such that the rollers cut out food product pieces of the desired peripheral shape and completely sealing all the peripheral edges around the desired shaped pieces with said cutting elements; and injecting air between said first and second food product dough strips as they enter between the rotating rollers to form a pocket between the first and second food product dough strips prior to the sealing of the peripheral edges completely around the periphery of the shaped pieces to ensure that the first and second product dough strips do not stick or bond together after the cutting operation thereby forming a half-product for producing a puffed food product.

2. A process for making a half-product to be used in forming a puffed food and comprising the steps of:

passing two parallel strips of food product dough in superimposed relationship between two abutting rollers, at least one of which has V-shaped cutting elements, in a predetermined pattern on the periphery thereof to cut a desired peripheral edge shape for the food half-product and to completely seal all around the peripheral edges of each of said cut shapes; and injecting air between said first and second food product dough strips prior to the complete sealing all around the peripheral edges of said cut shape to create a pocket therein and form a half-product for producing a puffed food product.

3. A process as in claim 2 further comprising the steps of:

cutting said desired shape from said dough strips with a cutting element on said roller having a V-shaped raised portion with an arcuated outer cutting end; and rolling said arcuated outer cutting end into and out of the food product dough strips at an elongated angle to form an elongated sealing surface between the dough strips forming the half-product.

4. A process as in claim 3 further comprising the steps of:

cutting said food strips with cutting elements on both said first and second rollers; and superimposing said cutting elements in meshing relationship during rotation of the first and second rollers.

5. A method of using a roller having a first cutting element in combination with a second abutting surface to cut and form half-product food shapes from superimposed first and second food product dough strips being fed between said first cutting element and said second abutting surface, the method comprising the steps of:

forming said food shapes using said roller having raised V-shaped cutting elements on the periphery thereof in patterns that form said food shapes, said V-shaped raised cutting elements having an outer cutting end that is arcuated in shape;

rolling the arcuated outer cutting end of the V-shaped raised cutting elements into the second abutting surface such that as the cutting end of the raised cutting elements enters and leaves the superimposed first and second dough strips, the arcuated end forms the half-product food shapes with an elongated sealing surface between the dough strips around the entire peripheral edges of the half-product food shape; and injecting air between said first and second food product dough strips prior to complete sealing of all the peripheral edges of the cut shape to create a pocket therein and form the half-product for producing a puffed food product.

\* \* \* \* \*